Oct. 22, 1963   J. VERGARA OCHOA   3,107,683
ADMISSION AND CHECK VALVE FOR PNEUMATIC BALLS
Filed May 26, 1961

INVENTOR
JAIME VERGARA OCHOA

Attys.

ly, it is necessary to press... [skipping]

United States Patent Office 3,107,683
Patented Oct. 22, 1963

3,107,683
ADMISSION AND CHECK VALVE FOR PNEUMATIC BALLS
Jaime Vergara Ochoa, Guadalajara, Jalisco, Mexico, assignor to Industrias de Occidente, S.A., Guadalajara, Jalisco, Mexico, a corporation of Mexico
Filed May 26, 1961, Ser. No. 113,030
2 Claims. (Cl. 137—223)

The present invention refers to an admission and check valve for pneumatic balls, whose construction has been improved, being different from those known because it is provided with a new means for permitting the injection of air in the ball for the purpose of inflating it; but not to permit, once the ball is blown, that the air contained inside can escape through the valve and to inject air when the ball has been partially or totally deflated during its use.

The admission and check valve object of the present invention is of a very simple construction and is very efficient, at the same time its cost is low and it is very light in weight.

*Description.*—The characteristic details of the present admission and check valve for pneumatic balls, are clearly shown in the following description and in the drawings which accompany same, as an illustration of it and in these drawings, the referring signs, serve to indicate the same parts in the three figures shown:

Figure 1:
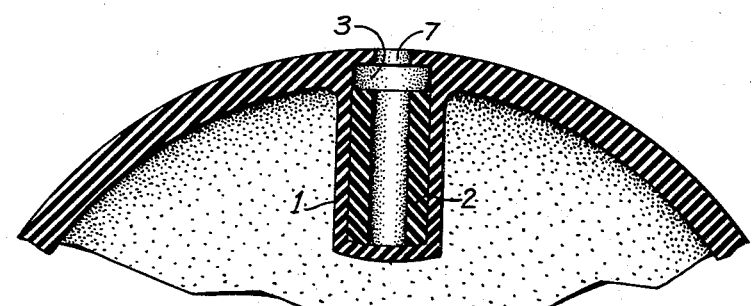
FIGURE 1 shows a cross section of the ball, where the invention is incorporated.

Referring to these drawings, the present admission and check valve for pneumatic balls is made up of: One cylinder 1 placed in the inside of the ball and made of the same plastic material, rubber, etc., of which the body of the ball is made, thereby, making a single piece with this body. Cylinder 1 is closed below and around it, in the inside, it is provided with another cylinder 2 attached to it which enlarges its corresponding side and said cylinder which fits with a perforation 7 practiced in the body of the ball, so forming near this perforation, a cylindrical seat 3.

The plugging piece 4 shall be constructed of a plastic or any other resisting and light material and it affects a cylindrical form ending also in a cylindrical head 5 of a larger diameter and provided with a cross section in the direction of the radius 6.

To inflate a ball which is provided with the admission and check valve object of the present invention, through the perforation 7 of the ball and the corresponding cylindrical hollow, an injection needle is introduced which perforates and passes the bottom of cylinder 1 through its center, and by means of this needle air is introduced in the ball in the correct amount so that it is duly inflated.

Figure 2:
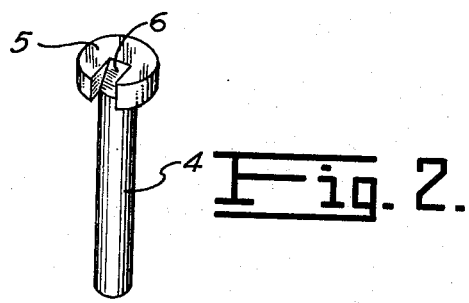
FIGURE 2 shows in perspective the check piece of the valve.
Figure 3:
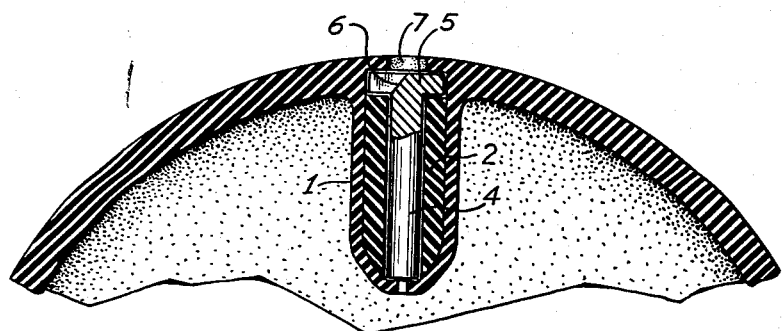
FIGURE 3 shows a cross section of the ball illustrated in FIGURE 1, with the plug piece inserted in the inside of this valve.

On extracting the injection needle, the bottom of cylinder 1 is duly perforated and to plug this perforation 7, the plugging piece 4, illustrated in FIGURE 2, is introduced through perforation 7 until the lower side of its cylindrical body makes contact with the bottom of cylinder 1. So that the head 5 of the plugging piece 4 enters in the cylindrical seat 3 of the valve, it is necessary to press downward on this piece, so that the material of which cylinder 1 is made stretches, and in this way, the lower side of the plugging piece 4 remains perfectly attached to the botom of cylinder 1 covering the perforation made by the needle at the bottom of this cylinder and at the same time, the sides of the enlarged cylinder 2 remain perfectly adhered to the side of the plugging piece 4, said adherence is helped by the pressure of the air inside the ball. The above will stop air escapes through the valve.

When under any circumstances the ball deflates totally or partially, it can be inflated again without the necessity of extracting the plugging piece 4 of the valve, using only the cross section 6 of the head 5 of this piece, air will be introduced either introducing the injection needle or a small tube of an air hose, air which on entering under pressure compels the cylinders 1 and 2 to separate from the cylinder of the plugging piece 4 and enters through the perforation made at the base of cylinder 1, after which, when the pressure of air stops, the valve again closes and does not allow the outside escape of air.

Before passing on to specify the points claimed and of my property in the next chapter, I want it being understood that the former descriptive memorial does not have the intention of limiting my rights of invention strictly to the letter of same not least its illustrations, seeing that it is possible to carry out some changes which do not modify the essentiallity of the invention.

I claim:

1. A valve assembly for an inflatable article comprising an elastic, tubular valve body open at one end and sealed by a puncturable closing wall at the other end, a groove in said tubular body surrounding the bore thereof and spaced inwardly of said open end, a rigid valve including a cylindrical shank having a diameter approximately equal to the bore of said body and a disc-like head of a size and shape corresponding to said groove, the shank of said valve being of greater length than the length of said body between the groove and the closing wall, said valve being disposable in said body after puncture of said closing wall during inflation of the article to seat the valve head in said groove and stretch the valve body so that its bore contracts in a fluid tight manner about the valve shank, and a slot formed through the head of said valve to permit the passage of fluid under pressure through the bore of the valve body.

2. A valve assembly for an inflatable article according to claim 1 wherein said elastic valve body comprises an outer tube of the same material and formed in one piece with the article, and an inner tube seated within the outer tube and cemented thereto.

References Cited in the file of this patent

UNITED STATES PATENTS

| | | |
|---|---|---|
| 2,318,115 | Tubbs | May 4, 1943 |
| 2,349,463 | Riddell | May 23, 1944 |
| 2,387,455 | McDermott | Oct. 23, 1945 |
| 2,760,775 | Tipton | Aug. 28, 1956 |
| 2,989,068 | Delacoste | June 20, 1961 |

FOREIGN PATENTS

| | | |
|---|---|---|
| 1,134,593 | France | Dec. 3, 1956 |